Figure 1:
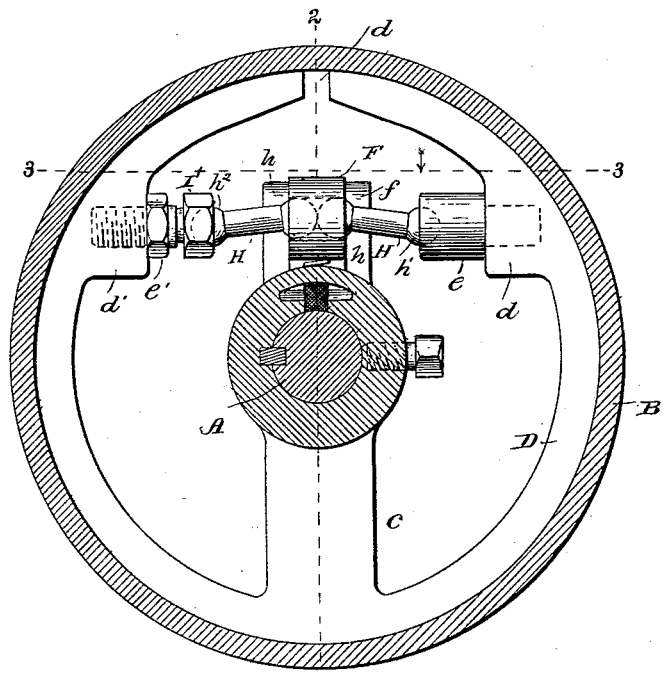

(No Model.) 4 Sheets—Sheet 1.

G. W. DRAKE.
FRICTION CLUTCH.

No. 448,777. Patented Mar. 24, 1891.

ATTEST.
Victor J. Evans
E. E. Pate

INVENTOR.
G. W. Drake
By Hall and Fay
his attorneys (No Model.)  4 Sheets—Sheet 2.

G. W. DRAKE.
FRICTION CLUTCH.

No. 448,777. Patented Mar. 24, 1891.

ATTEST.
Victor J. Evans.
C. E. Pate

INVENTOR.
G. W. Drake
By Hall and Gay his attorneys.

(No Model.) 4 Sheets—Sheet 3.

G. W. DRAKE.
FRICTION CLUTCH.

No. 448,777. Patented Mar. 24, 1891.

ATTEST.
Victor J. Evans
E. E. Pate

INVENTOR.
G. W. Drake
By Hall and Fay
his attorneys (No Model.) 4 Sheets—Sheet 4.

G. W. DRAKE.
FRICTION CLUTCH.

No. 448,777. Patented Mar. 24, 1891.

ATTEST.
Victor J. Evans.
E. E. Pate

INVENTOR.
G. W. Drake
By Hall and Fay his attorneys.

THE NORRIS PETERS CO., PHOTO-LITHO., WASHINGTON, D. C.

UNITED STATES PATENT OFFICE.

GEORGE W. DRAKE, OF CLEVELAND, OHIO, ASSIGNOR OF ONE-HALF TO WILLIAM S. LANE, OF SAME PLACE.

FRICTION-CLUTCH.

SPECIFICATION forming part of Letters Patent No. 448,777, dated March 24, 1891.

Application filed July 31, 1890. Serial No. 360,442. (No model.)

*To all whom it may concern:*

Be it known that I, GEORGE W. DRAKE, a citizen of the United States, and a resident of Cleveland, county of Cuyahoga, and State of Ohio, have invented certain new and useful Improvements in Friction-Clutches, of which the following is a specification, the principle of the invention being herein explained, and the best mode in which I have contemplated applying that principle so as to distinguish it from other inventions.

My invention relates to friction-clutches for operatively connecting pulleys with their actuating-shafts—that is, to pulleys which rotate freely on the shaft at one time and drive the shaft at another time.

In friction-pulleys of the class to which my invention relates the expansible ring, which is rigidly connected to the shaft and is expanded to bear against the inner side of the loose pulley, usually is expanded by toggle-arms connected to the free ends of said rings and to a sliding block, which again is radially moved by means of a lever, a wedge, or other means operated by a sleeve sliding upon the shaft. This block, however, is liable to be jammed in its sliding bearings or guides, especially when it becomes worn, so as to obstruct the prompt action of the clutch. It is also liable to be jammed and caught by being tilted in its bearings on account of unequal wear upon the toggle-arms or their bearing points or sockets. Furthermore, besides the fact that said block adds to the complexity and consequent cost and labor in constructing and operating the pulley, it is liable to be crushed or broken by the strain exerted upon it in spreading the toggle-arms and the free ends of the expansible ring. It is also impossible to compensate for wear of the rim of the loose pulley of the expansible ring or of the toggle-arms and their bearings by lengthening one toggle-arm or by adjusting one of its bearing-points without throwing the sliding block out of its true position. Both toggle-arms or the bearing-points for both arms must be adjusted to make successful provision for taking up wear.

The objects of my invention are to obviate these disadvantages by doing away with the radially-movable block and forming a bearing for the inner ends of the toggle-arms in the arm or lever which is operated by the sliding cone, by forming said bearing entirely through the arm or lever, so that the ends of the toggle-arms will bear one against the other, and by combining said structure with an adjustable bearing-point for the outer end of one of the toggle-arms.

Figure 2:
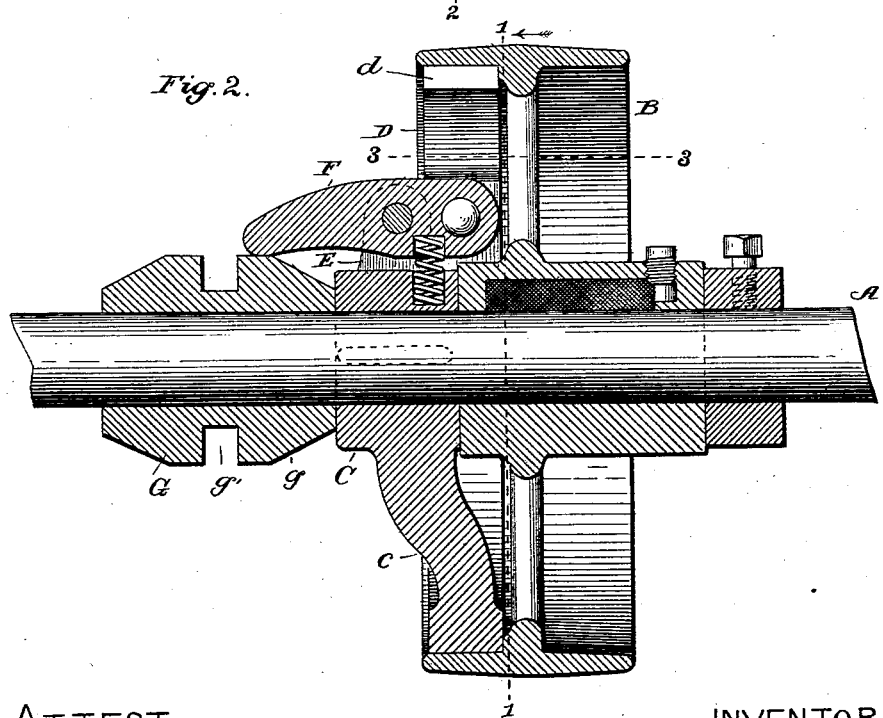
Figure 3:
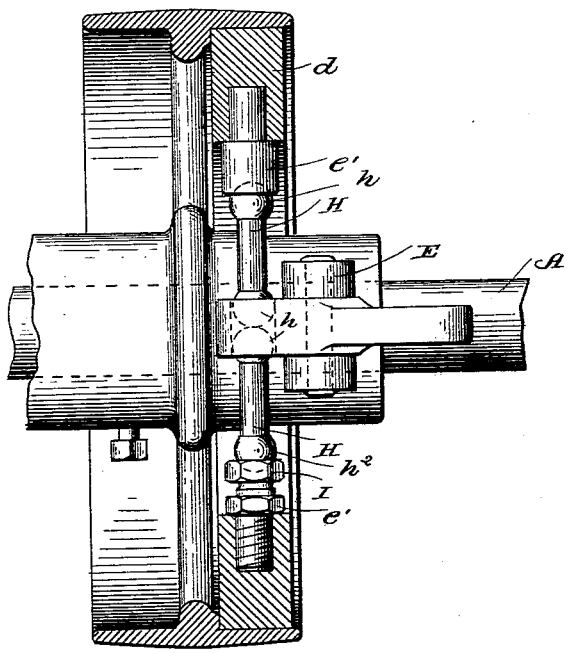
Figure 5:
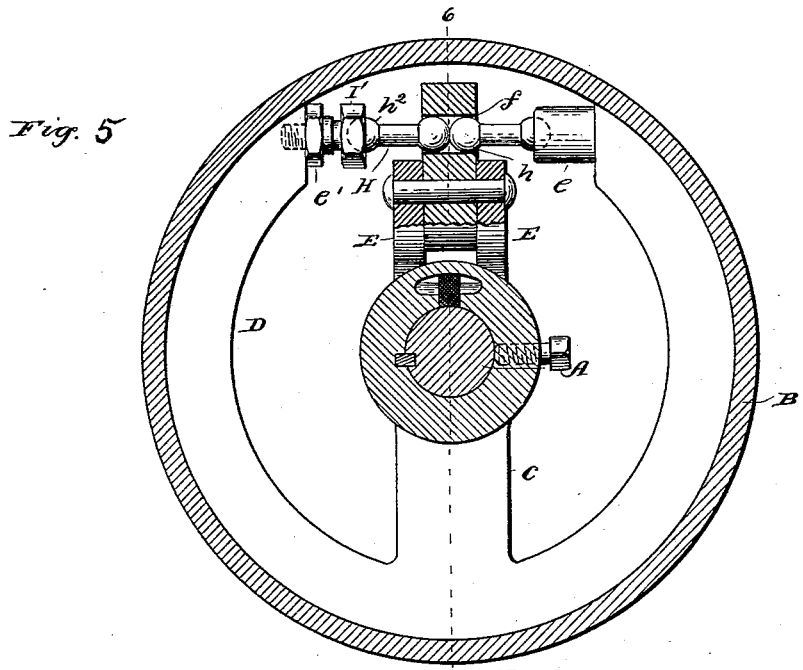
Figure 4:
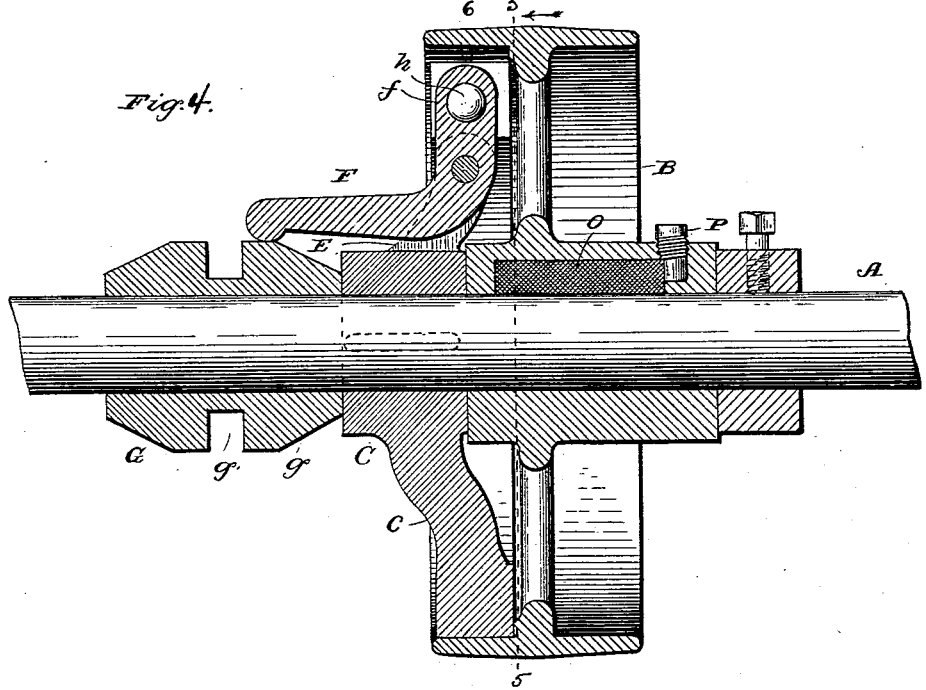
Figure 6:
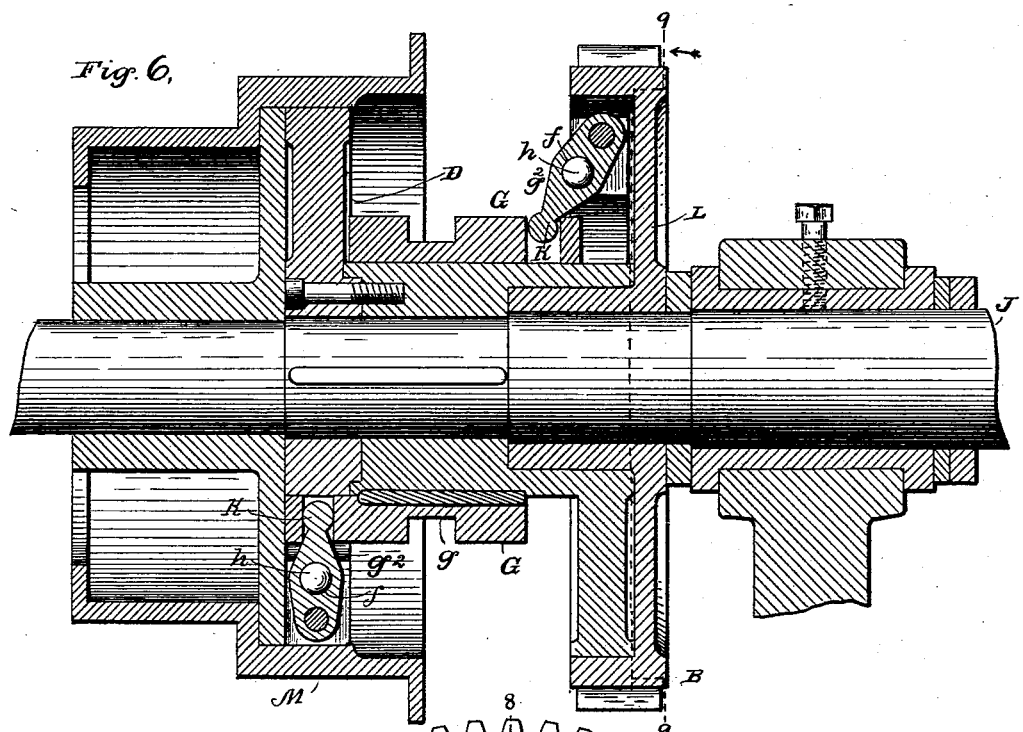
Figure 7:
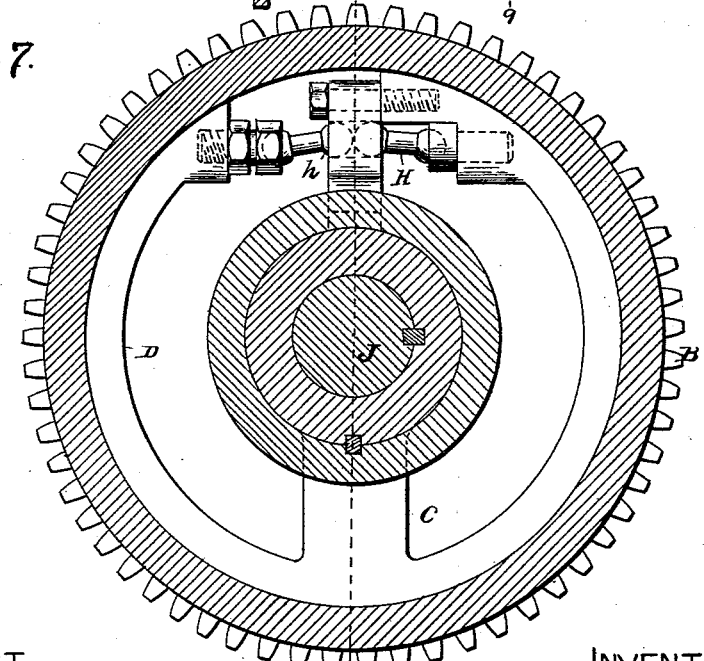

Referring to the drawings, Figure 1 is a transverse vertical section of a friction-pulley mechanism embodying one adaptation of my invention as applied to a friction countershaft, the section being taken upon the line 1 1 of Fig. 2. Fig. 2 is a transverse vertical section of the same on the line 2 2 of Fig. 1. Fig. 3 is a horizontal cross-section of the same on the line 3 3 of Figs. 1 and 2. Fig. 4 is a view similar to Fig. 2, but showing a modified embodiment of my invention. Fig. 5 is a transverse section of the structure shown in Fig. 4 on the line 5 5 of the latter. Fig. 6 is a vertical longitudinal section of a pulley mechanism embodying my invention and applied to the spindle of a screw machine or lathe. Fig. 7 is a transverse vertical section on the line 9 9 of Fig. 6.

Referring first to Figs. 1, 2, and 3 of the drawings, A is a line-shaft, which may be placed either overhead or beneath the floor or elsewhere, as desired. B is a loose pulley, which may be either for a flat belt or for any usual or preferred form of driving connection, the pulley being assumed to be a driving-pulley. This pulley is loosely mounted upon the shaft A, so that ordinarily it is an idler. A hub C is keyed or otherwise attached to the shaft A, so as to turn therewith, and this hub carries a radial arm $c$, to which a circular expanding friction-ring D is attached, or the ring may, if preferred, be formed upon said arm $c$. This ring is not continuous, but it is split at $d$—that is to say, at a point opposite from its point of attachment to or connection with the arm $c$. Between two standards E, which extend radially from hub C opposite from arm $c$, is pivoted a finger or arm F, the outer end of which engages an inclined surface $g$ of a sleeve G, which is mounted loosely upon shaft A, adjacent to the hub C, before referred to. The sleeve G is formed with a circumferential groove $g'$, within which the fork or strap of any suitable or preferred form of shipper engages, so that the sleeve can be moved toward or away from hub C by the shipper. The inner end of this finger or arm F is formed with an opening $f$, which extends entirely through the finger or arm and which serves to receive the spherical ends $h$ of two toggle-levers H. It will be best seen by reference to Fig. 1 that these spherical ends $h$ abut directly against each other, and the result is that no strain whatever comes upon the finger, but that all of the strain is borne directly by the toggle-levers, as will be obvious from the ensuing description. The free or movable portions of the expanding ring D are formed with bosses, respectively, $d\ d'$, which constitute sockets for the stems of oppositely-disposed removable sockets, respectively, $e\ e'$. The socket $e$ is a rigid socket to receive the outer ball or head $h'$ of the adjacent toggle-lever H. The outer head or ball $h^2$ of the opposite toggle-lever H rests in a socket, which is formed in the end of a screw-threaded adjustable socket-piece I', which works axially in the socket $e'$. From this description it will be seen that when the conical sleeve G is moved toward the hub C the inner end of the arm or finger F will be depressed, consequently drawing downward upon the adjacent ends of the toggle-levers H and thus expanding both arms of the expanding ring D equally, and thus also affording an extensive and balanced contact throughout the outer surfaces of the arms of the expanding ring D and the adjacent inner surfaces of the rim of the loose pulley B. Thus it will be seen that a very firm and effective hold is secured upon the inner surface of the rim of the loose pulley B, so that no slipping or jarring of the pulley occurs when said pulley is brought into engagement with the shaft.

In Figs. 4 and 5 I have shown substantially the same operative arrangement, the difference being simply that the arm or finger F is L-shaped and that the recess or socket for the heads $h$ of toggle-levers H is vertically above the pivotal point of the finger arm or cam, instead of being in horizontal relation to said pivotal point, as shown in the preceding figures.

In Figs. 6 and 7 I show a modification. In these figures J designates the spindle of a screw machine or lathe. G, as before, designates the shipper-sleeve, and $g'$ the groove for the forked arm or strap of the shipper-lever. Two end recesses $g^2$ are formed in the sleeve to receive the inner ends of the oppositely-disposed fingers K, which are pivoted at their outer ends to the expansible ring D, and the middles of these fingers have the through sockets or recesses $f$ to receive the abutting spherical ends $h$ of the toggle-levers H. L is the gear-wheel, and M the cone-pulley, both mounted loosely on the spindle, and each of these is acted upon by an expanding ring D, as before. The arrangement is such that by shifting the sleeve G in one direction one of the expanding rings is expanded, as before, thus bringing the gear or cone-pulley, as the case may be, into engagement with the shaft, and by shifting the sleeve G into a middle position both the gear-wheel and cone-pulley are disengaged from the shaft. This modified form is applicable to a friction counter-shaft, where it is especially desirable to keep the pulleys as near each other as possible, thus shortening up the counter-shaft, making it more compact and occupying less room for belts or pulleys on main or driving shaft. It is especially applicable to that class of machines called "friction-head machines" or "friction clutch-head screw-machines," where it is essential that the cone-pulley and gear-wheel to which the clutch is applied should be kept as nearly together as possible, thereby shortening up the head.

From the foregoing it is obvious that the toggle-arms will exert equal pressure upon both arms of the expansible ring when they are straightened out, and that they will exert no crushing strain upon the finger or lever F. If the inner surface of the pulley, the expansible ring, or the toggle-arms or their sockets become worn to such an extent as to interfere with the prompt working of the clutch, such wear may be taken up by screwing the socket-piece I' farther out of its socket. This will not throw the end of the lever or finger F out of alignment, as the toggle-arm which bears against said socket-piece will simply be forced slightly to one side in the transverse hole $f$, and both toggle-arms will press equally hard against their respective arms of the expansible ring. By making the socket-piece for one of the toggle-arms adjustable instead of the toggle-arm, the same shape and size of arm may be used for both sides, and the arm will not be weakened or its construction complicated by making it longitudinally adjustable.

The foregoing description and accompanying drawings set forth in detail mechanism embodying my invention. Change may be made therein provided the principles of construction respectively cited in the following claims are employed.

I therefore particularly point out and distinctly claim as my invention—

1. In a friction-clutch pulley, the combination of a split expansible friction-ring, a pivoted lever formed with a transverse opening entirely through it and having means for rocking it, and toggle-arms having bearing-points upon the arms of said ring and having their inner ends directly bearing against each other within the opening in said lever, substantially as described.

2. In a friction-clutch pulley, the combination of a split expansible friction-ring, a lever pivoted upon the hub of said ring and formed with a transverse opening through its inner end, toggle-arms bearing against the arms of said ring and having their inner ends directly abutting against each other within the opening of said lever, and a conical sliding sleeve bearing with its incline against the outer end of said lever, substantially as described.

3. In a friction-clutch pulley, the combination of a split expansible friction-ring, a pivoted lever formed with a transverse opening through it and having means for rocking it, a socket-piece secured longitudinally adjustable in one arm of said ring, and toggle-arms having their inner ends bearing against one another in the opening of said lever and having their outer ends, respectively, bearing against said socket-piece and the opposite arm of said ring, substantially as set forth.

4. In a friction-clutch pulley, the combination of a split expansible friction-ring formed with opposite sockets in its arms, a socket-piece in one of said sockets, an adjustable socket-piece screw-threaded in the opposite socket, a pivoted lever formed with a transverse opening through it and having means for rocking it, and toggle-arms bearing against one another with their inner ends and against said socket-pieces with their outer ends, substantially as described.

In testimony that I claim the foregoing to be my invention I have hereunto set my hand this 19th day of July, A. D. 1890.

GEORGE W. DRAKE.

Witnesses:
CARRIE B. DRAKE,
J. B. FAY.